R. E. CAMPBELL.
PNEUMATIC TIRE FOR VEHICLES.
APPLICATION FILED AUG. 14, 1912.
1,201,252.
Patented Oct. 17, 1916.
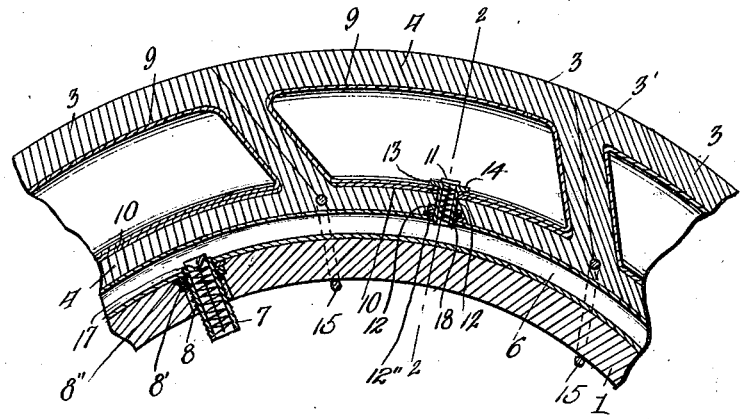
Fig. 1.
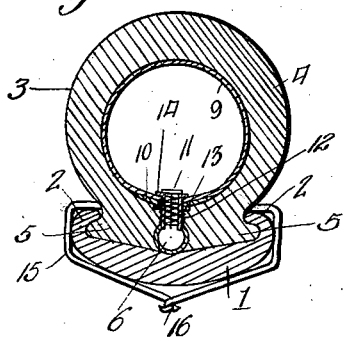
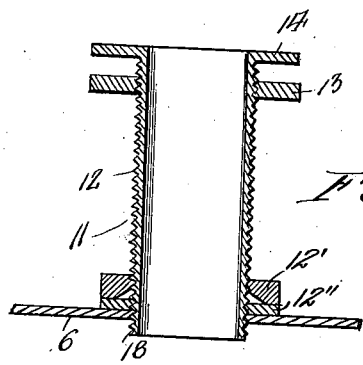
WITNESSES
G. M. Spring
INVENTOR
Ronald E. Campbell,
by Richard Dewer
his Attorney

UNITED STATES PATENT OFFICE.

RONALD E. CAMPBELL, OF COLUMBIA, SOUTH CAROLINA.

PNEUMATIC TIRE FOR VEHICLES.

1,201,252.  Specification of Letters Patent.  Patented Oct. 17, 1916.

Application filed August 14, 1912. Serial No. 715,093.

*To all whom it may concern:*

Be it known that I, RONALD E. CAMPBELL, a citizen of the United States, residing at Columbia, in the county of Richland and State of South Carolina, have invented new and useful Improvements in Pneumatic Tires for Vehicles, of which the following is a specification.

This invention relates to pneumatic tires for vehicles.

One object of the invention is to provide a pneumatic tire made of a number of removable and replaceable sections each having means to admit air thereto from a common tube or supply.

A further object of the invention is to provide a novel formation of the tire sections and means for securing the same to the rim of a vehicle wheel.

The preferred embodiment of my invention is hereinafter described and illustrated in the accompanying drawings.

In the drawings: Figure 1 is a vertical sectional view illustrating the tire in connection with a vehicle rim, the tire and rim being partially shown. Fig. 2 is a transverse sectional view on the line 2—2 of Fig. 1. Fig. 3 is a detail vertical sectional view through a valve tube or casing of one of the valves of a removable tire section, and Fig. 4 is a fragmentary view partly in section and showing the common air tube for the tire sections.

Referring to the drawings, 1 designates a rim of any suitable form of vehicle wheel which rim is provided with bent over flanges at 2.

The removable sections of the tire are designated 3, and the end walls 3' of the sections 3 abut and are inclined at an angle with respect to the periphery of the tire or rim. Each section 3 has an outer casing 4 which is of a somewhat heavy construction and which is preferably split longitudinally, centrally of the portion of the casing 4 which engages the rim 1. Each outer casing 3 has heels 5 with which the flanges 2 engage.

In the casing 4 centrally of the heels 5, is preferably held a continuous tube 6, preferably of metal, with which communicates a removable valve 7 through which air to inflate the tire sections is pumped to the tube 6. Said valve may be of any approved construction, and as shown, has screw threads 8 which engage screw threads of an opening in the tube 6 and on which threads 8 rides a nut 8'. A washer 8" preferably of rubber, surrounds the valve and is clamped between the tube 6 and nut 8' so as to provide an air tight joint between the valve and tube. In each of the sections 3, interiorly of the casing 4, is inserted preferably through a longitudinal opening of the casing 4 referred to, a thin inner tube 9 of rubber. Each tube may be reinforced with a rubber band 10, located adjacent the opening formed at the meeting longitudinal edges of the section, if desired.

A valve 11 is located in each of the tire sections 3 so as to communicate with the tube 6 and with the inner tube 9 of the sections. This valve is preferably of the construction shown best in Fig. 3. The valve consists of a tube 12 which is threaded on its exterior so as to permit the nut 13 to work thereon. A flange 14 is provided on the outer end of said tube 12 and this flange rests upon the interior of the inner tube 9 and a portion of the tube is clamped between said flange 14 by adjusting the nut 13 relatively thereto. The threads of the tube 12 engage a screw threaded opening of the tube 6 and a nut 12' rides on said threads of the tube and clamps between the same and the tube 6 a washer 12" preferably of rubber, so as to form an air tight joint between the valve and tube 6. Each section 3 has a transverse semicircular groove provided therein on each of the faces 3'. The grooves of each section register with adjacent grooves of the adjoining sections and provide a circular opening through which means may be passed for securing the sections to the rim. Said means as shown consists of a tie member 15 formed of a rod or wire of metal passed through the openings and bent around the rim 1, and the ends thereof joined at 16.

It will be seen that each wire or tying member 15 engages two of the sections of the tire and securely fastens the same to the rim 1, and at the same time removably fastens the sections so that in case the sections become punctured or worn it may be removed and a new section substituted therefor, which avoids the necessity of equipping the wheel with a new tire in case of wearing at a portion thereof or in case of puncture.

It is clear that changes in the details of construction may be made provided the same fall within the spirit and scope of the appended claims.

Having thus described my invention, what I claim is:

1. In combination with a wheel rim, a plurality of removable sections, flanges formed upon the lower sides of each of said sections in engagement with said rim, said sections having their end walls inclined and abutting each other at angles to the periphery of said rim, each of said sections having formed in their end walls semi-circular registering grooves to form a transverse circular opening, and a removable flexible rod engaging said opening and said rim and having its opposite ends twisted together at the inner periphery of said rim to provide positive securing means for said sections upon said rim, substantially as described and for the purposes set forth.

2. In combination with a wheel rim, a plurality of removable sections, each of said sections comprising an outer casing provided with a longitudinal slit in the bottom thereof, a removable inner tube insertible through said slit, a non-breakable air supply tube, a valve device connecting each of said sections with said supply tube, a rubber band disposed about said valve device and disposed between said inner tube and the bottom of said casing, and means arranged about each of the valve devices for clamping the rubber band about the slit to protect and reinforce the casing and to provide a nonleaking joint between the inner tube and the air tube.

RONALD E. CAMPBELL.

Witnesses:
  ANDREW J. BETHEN,
  E. L. CRAIG.